United States Patent Office 3,830,921
Patented Aug. 20, 1974

3,830,921
PYRIDINE INSECTICIDES
Elmer R. Johnson, Walter T. Reed, Charles H. Tieman, and Samuel B. Soloway, Modesto, Calif., assignors to Shell Oil Company
No Drawing. Filed Apr. 6, 1973, Ser. No. 348,576
Int. Cl. A01n 9/00, 9/22
U.S. Cl. 424—263                           3 Claims

ABSTRACT OF THE DISCLOSURE

2 - (nitromethyl)pyridines are useful insect control agents.

Field of the Invention

This invention relates to the use of 2-(nitromethyl)-pyridines for controlling unwanted insects, and to insecticidal formulations of such substituted pyridines.

Description of the Prior Art

U.S. Pat. 3,480,636 discloses 2-(nitromethyl)pyridine and 2-(chloronitromethyl)pyridine as intermediates for preparing other compounds. 2-(nitromethyl)pyridine also is disclosed in Zalukaev and Vanag, J. Gen. Chem. (USSR) 27, 3314 (1957) and in Hurst et al., J. Chem. Soc. 1965, 2948. Neither discloses any biological activity for the compound.

A number of 2-(nitromethyl)pyridines are disclosed in a thesis for Ph. D. degree by John P. Lawrence, "I. The Preparation of Alphanitroalkyl Heterocyclic Compounds by the Alkyl Nitrate Nitration. II. The Course of the Alkyl Nitrate Nitration of 2- and 4-isopropylpyridines," Purdue University, June 1960. In part this material is also reported in a communication from Feurer and Lawrence, J. Am. Chem. Soc., 91, 1856–7 (1969). No utility for such compounds is mentioned in either.

Spectral analyses have indicated that those species of these nitromethylpyridines having at least one hydrogen in the nitromethyl moiety can exist in two tautomeric forms,

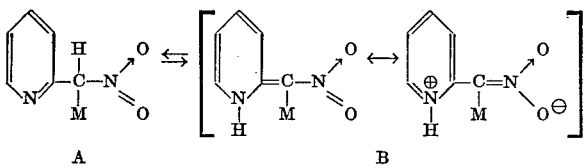

wherein M represents any moiety. Tautomer A is designated as a 2-(nitromethyl)pyridine, while tautomer B is a resonance hybrid, two forms which contribute thereto being indicated. The left-hand form can be designated as a 2-(nitromethylene)-1,2-dihydropyridine, while the right-hand form can be designated as an inner salt of an aci-nitromethylpyridinium hydroxide. The analyses have indicated that in the neat solid state, or in the presence of water or a hydroxylic solvent, the predominant tautomeric form is the resonance hybrid B, while in the presence of common non-hydroxylic solvents, the predominant form is A. At ordinary ambient temperatures, the conversion in solution from one form to the other is fairly rapid.

In the resonance hybrid the forms also can exist as cis- and trans-isomers, depending upon the spatial relationship of the moieties about the bond between the ring carbon atom and the carbon atom of the nitromethyl moiety.

In this specification, for the sake of simplicity, these compounds will be referred to generally as 2-(nitromethyl)-pyridines. The term is intended to include tautomer A, resonance hybrid B and the isomers, as well as mixtures thereof.

Summary of the Invention

It has now been found that 2-(nitromethyl)pyridines of this class can be used as insect control agents. They are of particular interest as "quick knockdown agents" for controlling flying insects.

The tautomeric form of the compound at the time it reaches the site of action in the insect has not been determined; however, it is believed the form is B. This belief is based upon the fact that at the site of action within an insect, the environment is largely aqueous. Thus, no matter the form of the compound when the insect comes into contact with it or ingests it, once the compound is in the aqueous environment inside the insect, form B becomes predominant, and expectably thus would be the form at the site of action within the insect.

However, the invention includes both tautomeric forms, for in solution in a conventional non-hydroxylic solvent—as for example in an aerosol formulation—the form apparently will be A, and the invention includes such formulations and their use for controlling insects. The invention also includes the isomers.

Description of the Preferred Embodiments

The present invention accordingly provides insect control agents having the general formula:

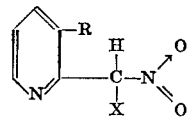

and the resonance hybrids represented by the formulas:

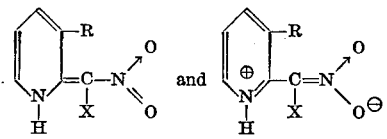

wherein R is lower alkyl, Cl or Br and X is H, Cl or Br.

Because of their effects on insects, a preferred subclass of these insect control agents is that in which R is lower straight-chain alkyl and X is hydrogen.

In these compounds, the alkyl group, R, preferably contains from 1 to 4 carbon atoms.

Species of this class of compounds, and a method for preparing the class, are disclosed in the Lawrence dissertation, mentioned above, as well as in the article by Feuer and Lawrence. In some cases, it is difficult to recover the 2-(nitromethyl)-pyridine from the final reaction mixture. In such cases, recovery may be facilitated by converting the 2-(nitromethyl)-pyridine to a derivative which is easily recovered, and to transform the derivative to the desired compound. In many cases, a convenient derivative is the 2-(mono(middle halo)nitromethyl)pyridine or the 2-(di(middle halo)nitromethyl)pyridine, since these derivatives are readily prepared (by halogenation of the 2-(nitromethyl)pyridine) and readily converted to the 2-(nitromethyl)pyridine (by treatment of the 2-(mono- or di(middle halo)nitromethyl)pyridine with sodium iodide or sodium borohydride). Preparation of the halogen derivatives also is shown by Feuer and Lawrence.

These and other procedures for preparing such 2-(nitromethyl)pyridines are illustrated in the following examples. In each case, the identity of the product was confirmed by elemental and spectral analysis.

Example I.—3-methyl-2-(nitromethyl)pyridine (I)

This compound was prepared as a yellow solid, melting point—58°–59°—according to the general method disclosed in Feuer and Lawrence.

EXAMPLE II.—3-ethyl-2-(bromonitromethyl) pyridine (II)

3-ethyl-2-(dibromonitromethyl)pyridine was prepared from 3-ethyl-2-methylpyridine according to the general method disclosed in Feuer and Lawrence. 5.0 grams of that compound was mixed with 25 milliliters of methanol. To that mixture was slowly added a solution of 5.1 grams of sodium iodide in 25 milliliters of water, the reaction mixture being held at about 10° C. The mixture then was made basic by adding a 10% solution of sodium hydroxide in water, and was extracted with methylene chloride. The mixture then was acidified and extracted with methylene chloride, the solvent was evaporated and the residue was chromatographed on silica gel, first using methylene chloride, then ether, as eluant, to give 0.6 gram of (II), as a brown solid melting point: 65–68° C.

EXAMPLE III.—3-ethyl-2-(nitromethylpyridine (III)

This compound was prepared as a yellow solid, melting point 63–66° by the method disclosed in Feuer and Lawrence, from 3-ethyl-2-methylpyridine.

EXAMPLE IV.—3-(n-propyl)-2-(nitromethyl) pyridine (IV)

3 - (n - propyl) - 2 - (dibromonitromethyl)pyridine melting point 49–50.5°, was prepared from 3-(n-propyl)-2-methylpyridine according to the methods disclosed in Feuer and Lawrence.

6 grams of the dibromo compound was slowly added to 3.8 grams of sodium borohydride in 50 milliliters of ethanol, the mixture being held at about 10° C. in an ice bath. 8 milliliters of acetic acid was added; the mixture was evaporated to dryness. A methylene chloride extract of the residue was washed with saturated sodium bicarbonate solution in water; the solvent was evaporated and the residue was triturated with ether to give 2.9 grams of (IV), as a yellow solid, melting point 66–70° C.

EXAMPLE V.—3-(n-butyl)-2-(nitromethyl) pyridine (V)

This was prepared from 3-(n-butyl)-2-methylpyridine by the procedures set forth in Example IV, above. (V) was obtained as a yellow solid, melting point 65–67° C.

EXAMPLE VI.—3-isopropyl-2-(nitromethyl) pyridine (VI)

This was prepared from 3-isopropyl-2-methylpyridine by the procedures set forth in Example IV, above, as yellow liquid.

EXAMPLE VII.—3-methyl-2-(chloronitromethyl) pyridine (VII)

To a stirred solution of 3.0 grams of (I) in 50 milliliters of 5% sodium hydroxide was added 28 milliliters of sodium hypochlorite solution dropwise over a 7-minute period, the temperature of the mixture being maintained at 8–10° C. The mixture was stirred for an additional half-hour and then was acidified with concentrated hydrochloric acid to a pH of about 5. It was extracted with methylene chloride, the extract dried and the solvent evaporated under reduced pressure to give 3.5 grams of a yellow solid, which on recrystallization from hexane gave 2.4 grams of (VII), as a yellow solid, melting point 75–77° C.

The pyridine toxicants of this invention have been found to have profound effects upon insects. While the mode of action has not been ascertained with certainty, it clearly differs from known modes by which chemicals act upon insects. In the cases of some insects, the compounds cause immobility and/or uncoordination and other effects. The toxicants act rapidly, and with respect to flying insects, such as houseflies, immobilize the insects so that they can be collected and destroyed; the compounds thus can be used as "quick knockdown agents." The immobilized or uncoordinated insects also are much more vulnerable to predators, parasites, and/or adverse climatic conditions. These toxicants are further characterized by low toxicity to mammals, so that they are relatively safe to use.

The invention includes within its scope insecticidal compositions comprising an adjuvant—that is, a carrier, optionally a surface-active agent—and, as active ingredient, at least one toxicant of this invention. Likewise the invention includes also a method of combating insect pests at a locus which comprises applying to the locus an effective amount of at least one toxicant of the invention.

The term "carrier" as used herein means a material, which may be inorganic or oragnic and of synthetic or natural origin, with which the active compound is mixed or formulated to facilitate its application to the plant, seed, soil and other object to be treated, or its storage, transport or handling. The carrier may be a solid or a fluid. Materials usually applied in formulating pesticides may be used as carrier.

Suitable solid carriers may be natural and synthetic clays and silicates, for example, natural silicas such as diatomaceous earths; magnesium silicates, for example, talcs; magnesium aluminum silicates, for example, attapulgites and vermiculites; aluminum silicates, for example, kaolinites, montmorillonites and micas; calcium carbonates; calcium sulfate; synthetic hydrated silicon oxides and synthetic calcium or aluminum silicates; elements such as for example, carbon and sulfur, natural and synthetic resins such as, for example, coumarone resins, polyvinyl chloride and styrene polymers and copolymers; solid polychlorophenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol; ketones, such as for example, acetone, methyl ethyl ketone, methyl isobutyl ketone and cyclohexanone; ethers; aromatic hydrocarbons such as for example, benzene, toluene and xylene; petroleum fractions such as for example kerosene, light mineral oils, chlorinated hydrocarbons, such as for example, carbon tetrachloride, perchloroethylene, trichloroethane, including liquefied normally vaporous gaseous compounds. Mixtures of different liquids are often suitable.

The surface-active agent may be an emulsifying agent or a dispersing agent or a wetting agent; it may be nonionic or ionic. Surface-active agents usually applied in formulating pesticides may be used. Examples of such surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example, p-octylphenol or p-octylcresol, with ethylene oxide and/or propylene oxide; sulfates or sulfonates of these condensation products; alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates or aerosols. Encapsulated formulations and controlled release formulations also are contemplated, as are bait formulations. Wettable powders are usually compounded to contain 25, 50 or 75% w. of toxicant and usually contain, in addition to solid carrier, 3–10% w. of a dispersing agent and, where necessary, up to 10% w. of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules may be manufactured by agglomeration or impregnation techniques. Generally, granules will contain ½–25% w. toxicant and 0–10% w. of additives such as stabilizers, slow release modifiers and binding agents. Emulsifiable concentrates usually contain, in addition to the solvent and, when necessary, co-solvent, 10–50% w./v. toxicant, 2–20% w./v. emulsifiers and 0–20% w./v. of appropriate additives such as stabilizers, penetrants and corrosion inhibitors. Suspension concentrates are compounded so as to obtain a stable, non-sedimenting, flowable product and usually contain 10–75% w. toxicant, 0–5% w. of dispersing agents, 0.1–10% w. of suspending agents such as protective colloids and thixotropic agents, 0–10% w. of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example, other compounds possessing pesticidal, herbicidal or fungicidal properties, or attractants, such as pheromones, attractive food ingredients, and the like, for use in baits and trap formulations.

These compositions are applied in sufficient amount to supply the effective dosage of toxicant at the locus to be protected. This dosage is dependent upon many factors, including the carrier employed, the method and conditions of application, whether the formulation is present at the locus in the form of an aerosol, or as a film, or as discrete particles, the thickness of film or size of particles, the insect species to be controlled and the like, proper consideration and resolution of these factors to provide the necessary dosage of active material at the locus being within the skill of those versed in the art. In general, however, the effective dosage of toxicants of this invention at the locus to be protected—i.e., the dosage to which the insect contacts—is of the order of 0.001% to 0.5% based on the total weight of the formulation, though under some circumstances the effective concentration will be as little as 0.0001% or as much as 2%, on the same basis.

Toxicants of this invention can be used as "quick knockdown" agents in the same manner and employing the same techniques as are conventionally used with such "quick knockdown" agents as the pyrethrins.

The effectiveness, including lethality of toxicants of this invention, can be increased by combining them with conventional synergists used with pyrethrin insecticides—e.g., with compounds containing the methylenedioxyphenyl moiety, such as piperonyl butoxide, piperonyl cyclonene, n-propyl isome, sesaxane (sesamex) and the like. A brief summary of such synergists is given at pages 215–218, "Insects," U.S.D.A. Yearbook of Agriculture, 1952.

The contemplated synergists are described in more detail in U.S. Pat. 3,053,729. The amount of synergist to be employed in the mixture can vary considerably. Thus, less than 1% may be sufficient, or 10% or even more may be required, by weight of the insecticidal mixture. Generally, about 1–2% by weight of the synergist in the mixture is preferred.

EXAMPLE VIII

Insecticidal activity was determined by means of appropriate tests which established the $LC_{50}$ dosage (dosage in grams of test compound per 100 milliliters of solvent required in the solution or suspension used as a spray to kill 50% of the test insects) of compounds of the invention with respect to several species of insects. The liquid carrier used to prepare the solution or suspension was composed of 2 parts by volume of acetone, 8 parts by volume of water and 0.05 parts by weight of Atlox, a wetting agent. The results are summarized in Table I.

TABLE I

| Number | $LC_{50}$ dosage of test compound for indicated insect | | | | | | | |
|---|---|---|---|---|---|---|---|---|
| | Housefly | Pea aphid | Rice weevil | Corn earworm | 2-spotted spider mite | Mosquito larva | Cabbage looper | Tobacco budworm |
| I | .09 | .0056 | >.1 | .108 | >.2 | 5 p.p.m. | >0.02 | .088 |
| II | .09 | .05 | >.1 | >.3 | >.2 | 5 p.p.m. | | |
| III | .12 | .1 | >.1 | .186 | >.2 | 5 p.p.m. | >0.02 | |
| IV | .082 | .0129 | >.1 | .3 | >.2 | .2 p.p.m. | | |
| V | >.5 | .06 | >.1 | >.2 | >.2 | 5 | | |
| VI | .66 | >0.2 | >.1 | >.2 | >.2 | 10 p.p.m. | | |
| VII | .7 | ≈.1 | >.1 | >.2 | >.2 | >10 p.p.m. | | |

EXAMPLE IX

Quick knockdown potential was determined by observation of the housefly during the primary screening reported in Example VIII. A test compound was considered to be an effective quick knockdown agent if it immobilized 80% of the flies in 30 minutes, at a concentration of 0.5% w./v. in the spray used. All of the compounds of Table I were found to qualify.

EXAMPLE X

These compounds that passed the screen in Example IX were tested at a dosage of 0.1% w./v. in the spray. Any such compound that immobilized 50% of the flies in 30 minutes was further tested, using the same procedure, to determine its $KT_{50}$ value (minutes required to immobilize 50% of the flies at a spray dosage of 0.1% w./v.) $KT_{50}$ values found are summarized in Table II.

TABLE II

| Compound: | $KT_{50}$ |
|---|---|
| I | 2.3 |
| III | 2.4 |
| IV | 1.0 |
| V | 3.4 |

EXAMPLE XI

Those compounds which were found to have a $KT_{50}$ value equal to or less than 3 minutes were then tested as aerosol formulation in a Peet-Grady chamber. Compounds I, III and IV were also found to be quick knockdown agents in these tests.

What is claimed is:

1. A method for controlling flies, aphids, corn earworms, mosquito larvae, and tobacco budworms which comprises contacting said insects with an insecticidally effective amount of a compound of the general formula

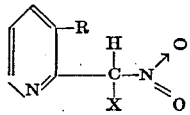

or its resonance hybrids wherein R is lower alkyl, and X is H, Cl or Br.

2. The method of claim 1 wherein R is straight-chain alkyl and X is hydrogen.

3. The method of claim 2 wherein R is n-propyl.

References Cited
UNITED STATES PATENTS
2,490,672  12/1949  Cislak et al. _____ 260—290 R
3,480,636  11/1969  Loev _____ 260—290 R ALBERT T. MEYERS, Primary Examiner
D. W. ROBINSON, Assistant Examiner U.S. Cl. X.R.
260—290 R